(12) United States Patent
Nguyen et al.

(10) Patent No.: US 10,938,975 B2
(45) Date of Patent: Mar. 2, 2021

(54) CLIENT-BASED MANAGEMENT OF MULTIMEDIA MESSAGES

(71) Applicants: Chi Luu Ngoc Nguyen, Lorton, VA (US); Chuong Luu Thanh Nguyen, Ho Chi Minh (VN)

(72) Inventors: Chi Luu Ngoc Nguyen, Lorton, VA (US); Chuong Luu Thanh Nguyen, Ho Chi Minh (VN)

( * ) Notice: Subject to any disclaimer, the term of this patent is extended or adjusted under 35 U.S.C. 154(b) by 0 days.

(21) Appl. No.: 15/853,891

(22) Filed: Dec. 25, 2017

(65) Prior Publication Data

US 2019/0199847 A1   Jun. 27, 2019

(51) Int. Cl.
*H04M 1/725* (2006.01)
*H04M 3/42* (2006.01)
*G06F 16/61* (2019.01)
*H04M 1/663* (2006.01)
*H04M 1/65* (2006.01)
(Continued)

(52) U.S. Cl.
CPC ........ *H04M 1/72547* (2013.01); *G06F 16/61* (2019.01); *H04M 1/65* (2013.01); *H04M 1/663* (2013.01); *H04M 3/42306* (2013.01); *H04M 3/53308* (2013.01); *H04L 61/1588* (2013.01); *H04M 2201/36* (2013.01); *H04W 4/46* (2018.02)

(58) Field of Classification Search
CPC .... H04M 1/725; H04M 1/72547; H04M 1/65; H04M 1/663; H04M 1/7255; H04M 3/42306; H04M 3/53308; H04M 2201/36; H04M 3/38; H04M 3/42323; H04M 3/533; H04M 3/53333; H04M 3/5335; H04M 3/53366; G06F 16/61; H04W 4/46; H04L 61/1588
See application file for complete search history.

(56) References Cited

U.S. PATENT DOCUMENTS 8,620,278 B1 *  12/2013  Oroskar .............. H04M 11/10
                                                  379/67.1
2002/0128036 A1 *  9/2002  Yach .................... H04M 1/725
                                                  455/552.1
(Continued)

OTHER PUBLICATIONS

Margaret Rouse, "What is hashing?", Sep. 2005, www.whatis.com, pp. 1-2 (Year: 2005).*

*Primary Examiner* — George Eng
*Assistant Examiner* — Hung K Du
(74) *Attorney, Agent, or Firm* — Patection, LLP

(57) ABSTRACT

A calling user initiates a telephonic communication with a receiving user by dialing a phone number of the receiving user in his or her address book. The communication is transmitted from the calling user's device to the receiving user's device through a network that is not using Internet protocol or Internet-based, e.g., Transmission Control Protocol (TCP), Internet Protocol (IP), TCP-IP, or Voice over Internet Protocol (VoIP). After a number of notifications has passed on the receiving user's device and the receiving user is not able to answer the telephonic communication, a local voicemail recorder will be activated to record and store the telephonic communication for later retrieval by the receiving user. The stored communication is identifier by a sequence of string containing at least one of a name, a telephone number, a storage location, a date-time attribute, and a duration associated with the stored communication.

9 Claims, 15 Drawing Sheets

(51) Int. Cl.
*H04M 3/533* (2006.01)
*H04L 29/12* (2006.01)
*H04W 4/46* (2018.01)

(56) References Cited

U.S. PATENT DOCUMENTS

| | | | |
|---|---|---|---|
| 2004/0062365 A1* | 4/2004 | Agraharam | H04M 3/53333 379/88.14 |
| 2006/0159060 A1* | 7/2006 | Fotta | H04M 3/38 370/351 |
| 2012/0053938 A1* | 3/2012 | Trivi | H04M 3/53366 704/235 |
| 2015/0326726 A1* | 11/2015 | Lee | H04M 3/533 455/411 |
| 2016/0110529 A1* | 4/2016 | Mathew | G06F 21/31 726/7 |

* cited by examiner

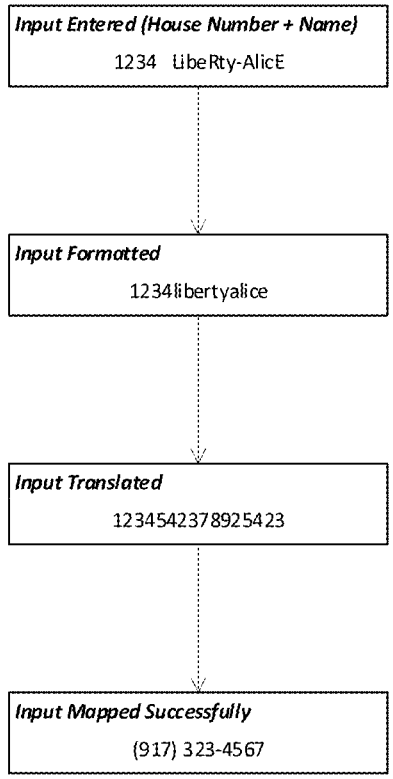
Figure 13(a)
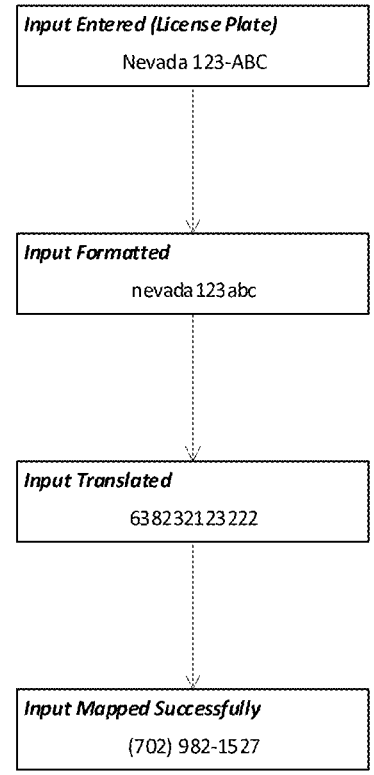
Figure 13(b)
1400
| | Translated Input | Registered Number | Full Name | Country | Blocked? | Order |
|---|---|---|---|---|---|---|
| 1401 | 1234542378925423 | (917) 323-4567 | Alice Clark | USA | No | NA |
| 1402 | 638232123222 | (702) 982-1527 | Peter Parker | USA | Yes | NA |
| 1403 | 1234567891010101 | +(84) 0909177095 | Chi Nguyen | Vietnam | No | 1 |
| 1404 | 1234567891010101 | (261) 958-3175 | Chuong Nguyen | USA | No | 2 |
Figure 14

CLIENT-BASED MANAGEMENT OF MULTIMEDIA MESSAGES

FIELD OF THE INVENTION

The present invention generally relates to a method for managing voicemails using a built-in voicemail recorder of a mobile device, a system and a non-transitory computer readable storage medium to implement the method.

DESCRIPTION OF RELATED ART

When a calling user wants to communicate with at least one receiving user via a communication network, the calling user dials a telephone number of the at least one receiving user. After a number of phone rings on the at least one receiving user's device, if the at least one receiving user is able to or wants to answer the incoming call, the at least one receiving user accepts the incoming call by actuating the "Accept" button or any button with similar function. In the event that the at least one receiving user is not able or does not want to answer the incoming call, the at least one receiving user denies the incoming call by actuating the "Reject" button or any button with similar function. Once the incoming call is rejected, the incoming call is either abolished or passed on to a voicemail recorder. For a wired landline communication, the voicemail recorder is an off line physical device connected externally to the at least one receiving user's device (e.g., through a network cable) or integrated within the at least one receiving user's device (e.g., desk phone with built-in answering machine). For a wireless communication, the voicemail recorder being an online voicemail server associated by the service provider associated with the receiving user. After the incoming call is recorded and stored as a voice message by either the off line answering machine or the online voicemail server, the at least one receiving user may retrieve the voice message for viewing, editing, playback or any other operation as is well-known in the art.

With respect to the wired landline network, the greatest inconvenience of a landline telephone system and any physically attached accessories (e.g., answering machine) is immobility and bulkiness. While the system is capable of recording a voice message of a calling user, a receiving user who desires to retrieve the recorded message has to manually read instructions to set up and operate the answering machine. A failure associated with the answering machine (e.g., power outage, or connection disruption) may be troublesome since important messages are not available when the failure occurs.

With respect the wireless network, after the voice message is left on the voicemail server by the calling user, the receiving user can later log on the voicemail server (e.g., by actuating a shortcut to a personal mailbox or by dialing a unique number associated with the personal mailbox) to retrieve the voice message. However, due to a limited storage space reserved for each user of the voicemail server, frequently each user is requested by the voicemail server to free up space in a corresponding mailbox to reserve space for any new incoming messages by deleting at least some of the existing messages automatically (e.g., based on an expiration timer) or manually by the user (e.g., save to a local storage selected the user). This frequent notification and the enforcement of message deletion when the mailboxes become full are tedious and annoying since valuable messages may be deleted against the will of corresponding users. For example, when Bob is reminded that his mailbox only has 500 Kilobytes left and he has to free up some space before existing messages are automatically deleted when new messages arrive, if Bob forgets to do so and a new voice message with a size of 1 Megabyte is recorded, valuable information in existing messages may be deleted with no chance of recovery. Further, some service providers charge a considerable amount of fee to provide and maintain the voicemail server with no guarantee that the voice messages would be available for access at all time.

In convention forms of wired or wireless telephonic communications, a phone number of the receiving user must be known in advance and such known phone number is used to initiate a communication by the calling user. This can be difficult for a user who desires to communicate with at least one other user associated with other identifiers different than a typical phone number (e.g., a license plate of a vehicle, a driver license ID, a mailbox address, a physical residential address, etc.) where a phone number of the at least one other user is generally not known beforehand or not possible to obtain. These factors can increase usage cost of the wired or wireless communication, and reduce the overall usability of the corresponding wired or wireless system.

It is thus desirable that a communication system provides a robust and affordable form of wireless communication.

SUMMARY

Various embodiments of a voicemail recorder used to manage voicemails are described. In one embodiment, the voicemail recorder integrated within a mobile device associated with the receiving user is utilized to handle the communication initiated by the calling user on behalf of the receiving user. In another embodiment, there is a determination whether the voicemail recorder is capable of handling the incoming communication and a decision between using the integrated voicemail recorder or the external voicemail server to handle the incoming communication is made based on the determination.

DESCRIPTION OF THE DRAWINGS

Advantages of the present invention will become apparent to those skilled in the art with the benefit of the following detailed description and upon reference to the accompanying drawings in which:

FIG. 13(a)-(b) show each an exemplary illustration of receiving, formatting, translating and mapping an input to a destination identifier.

FIG. 14 shows an exemplary table storing details and relationship between translated inputs and the destination identifiers.

DETAILED DESCRIPTION

Embodiments of the present invention are associated with at least a method, a system, and a computer-readable storage medium to manage "communication." As used herein, the term "communication" refers to any implementation of information or data. For example, a communication may comprise textual data, audio data, image data, video data, audiovisual data, or any combination thereof. Note that a communication may be exchanged between at least two or more entities, human or otherwise. A communication is described hereon as an exchange of data between an originating party and a receiving party wherein each party may comprise at least one of the mentioned entities. In one embodiment, the originating party and the receiving party each comprises one user. In another embodiment, the originating party and the receiving party each comprises at least one user or any combination thereof.

In some embodiments, a telephonic communication initiated by an originating party to a receiving party is enabled by the origination party utilizing an identifier associated with the receiving party. Conventionally, a telephone number, an e-mail address, a social network username, or similar information is being used as the identifier and the originating party has to obtain such information before any communication. Such deficiency is cured using embodiments of this instant invention wherein the originating party is able to communicate with the receiving party with at least some common and obvious information associated with the receiving party.

Figure 1:
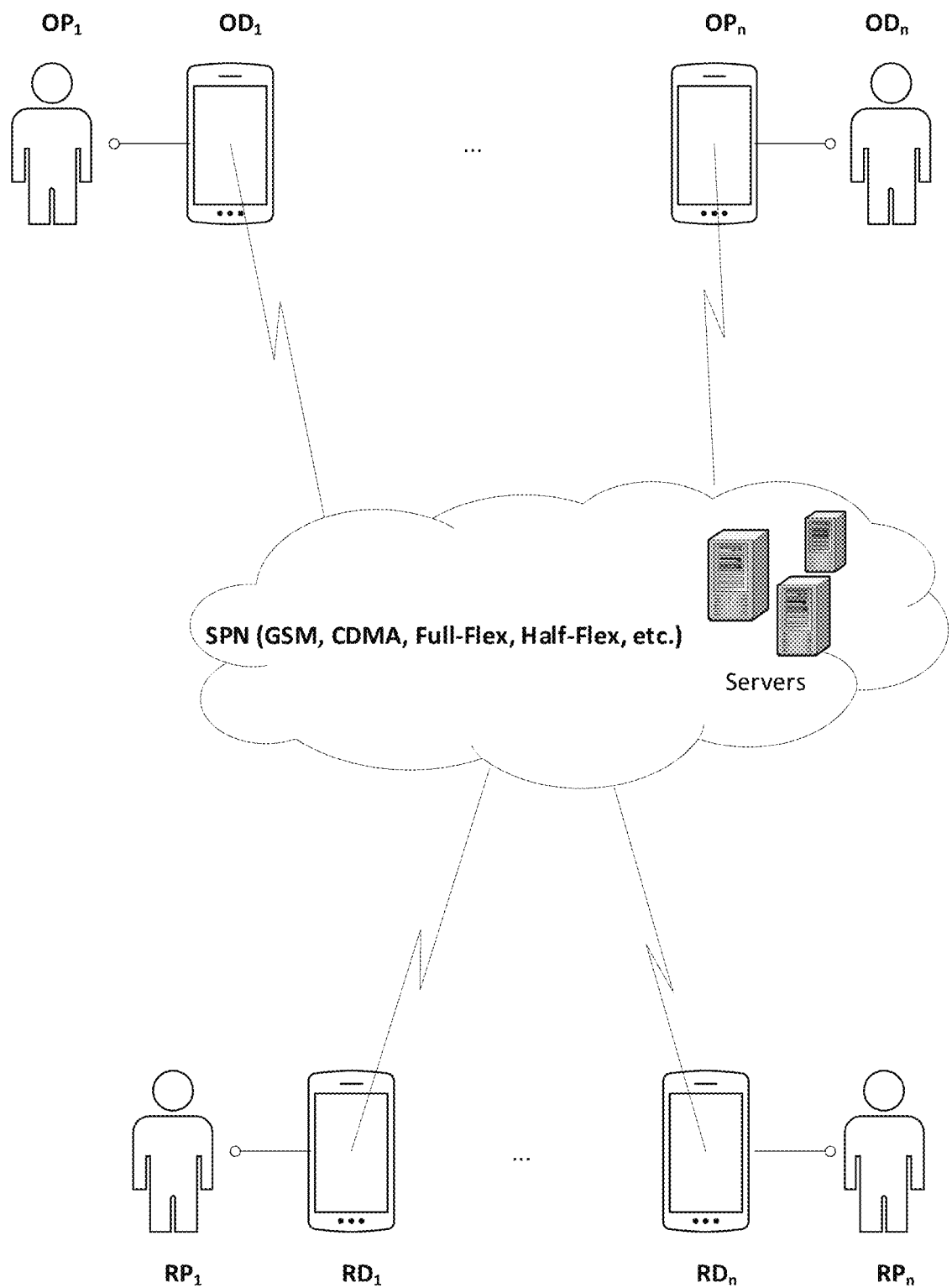
FIG. 1 is a graphical representation of an inter-vehicle network in accordance with one or more embodiments of the present technique.

FIG. 1 is a block diagram of an embodiment of the claimed communication system and its associated components. As shown in FIG. 1, an originating party $OP_1$ is associated with device $OD_1$, a receiving party $RP_1$ is associated device $RD_1$, service of each of the originating and receiving devices is enabled by at least one service provider and corresponding network SPN, wherein the at least one service provider and the corresponding network (Global System for Mobiles (GSM), Code Division Multiple Access (CDMA), full-flex or half-flex network) may be different among the originating and the receiving devices (e.g., one device is associated with AT&T service provider and GSM network, the other device is associated with Verizon service provider and CDMA network or any service provider using a combination of such networks).

In one embodiment, any publicly available information of a receiving party may be used by the originating party to establish a communication. For example, Alice is the homeowner at the residential address of "1234 Liberty Blvd, Brooklyn, N.Y. 00001", when Alice is away from the property and David, the neighbor, wants to inform Alice that her garage door is left opened. Conventionally, if David does not have Alice's phone number, there is no way for David to inform such a message to Alice. By using the instant invention, David only needs to input at least a part of Alice's residential address (e.g., 12340001 wherein 1234 is the house number and 00001 is the zip code) and such input is converted to a registered and private phone number of which Alice can be reached. In one embodiment, the input only contains digits that are quickly realized and obtained by the calling party. For example, David may input "12345423789" or "123425423" wherein "1234" is the house number and "5423789" is the name of the street "Liberty" or "25423" is the name of the homeowner "Alice" as represented on a conventional arrangement of a physical or virtual keypad of a desk phone or mobile phone (e.g., L=key 5, I=key 4, B=key 2, E=key 3, R=key 7, T=key 8, Y=key 9 or A=key 2, L=key 5, I=key 4, C=key 2, E=key 3) and the system will convert such sequence into a phone number that Alice had previously provided to the system. Social network identifiers may be used in the same manner, for example, "1234alice@gmail.com." Note that any non-digit character is translated manually by the calling party as described previously or automatically by the system to their equivalent digit representation. Another example is when a shipper delivered a package to a wrong address and the "accidental" recipient wants to return the package to its rightful recipient who ordered the package. Such "accidental" recipient can initiate a communication to the rightful owner using at least a residential address of the rightful recipient (e.g., presented on the shipping label of the received package) as described above. Another example where the present invention could be applied is when a driver parks his or her car in an illegal or ineligible location (e.g., assigned parking spots, handicap spots, fire or emergency spots, reserved spots, or any other spots that cause inconvenience or frustration to other persons, etc.), any person could use the invention to warn or courteously inform the driver of such mistake or wrongdoing and reduce any adverse action towards the driver (e.g., towing, parking tickets, etc.). In another example, instead of letting the voicemail server or the recorder to intercept the communication on behalf of the receiving user, the system, as described above, may forward the communication signal to a second receiving user authorized by the receiving user to handle the communication. For example, in a vehicular accident with at least one injured person, bystanders or witnesses can use the license plate of the at least one injured person's vehicle to inform his or her relatives regarding the event. As still another example, when a customer who purchase a product that needs troubleshooting, instead of spending a long period to look up a contact number of the product's manufacturer, Alice may conveniently enter the UPC code or other unique identifier of the product and Alice will be able to speak to a troubleshooter of the manufacturer in the least amount of waiting time. In another example, only registered users of the instant system may be communicated with one another. However, authoritative personnel can forcefully connect with the registered users of the instant system by using the associated identification information without having to register with the system (e.g., using an override methodology sanctioned by at least one law enforcement agency). For example, in a high traffic area such as passenger pickup zone of an airport, the maximum waiting time to pick up passengers for one vehicle is 5 minutes, if a vehicle has been idling in the pickup zone for more than the maximum waiting time, an airport personnel may communicate with the driver or owner of the vehicle (e.g., via the license plate) to request the vehicle to be vacated from the pickup zone for another vehicle.

It should be appreciated that the input entered may be further automatically or dynamically formatted to uniquely identify the receiving party. There are multiple types of identifiers that each can uniquely identify a party (e.g., Social Security Number (SSN), driver license number, a Vehicle Identification Number (VIN), tax payer ID, etc.), however, each of these identifier types is very difficult to obtain by the calling party due to their nature of being confidential. Thus, at least a portion of these identifier types (e.g., last 4 digits of a SSN) can be combined with any of other obvious identifiers discussed above to compose a unique identifier of a receiving party. Also, a unique identifier can be associated with a plurality of obvious identifiers (e.g., a unique telephone number of the receiving user is associated with a street number, license plate number or any combination thereof). Likewise, each obvious identifier may be linked to a plurality of unique identifiers (e.g., a company street address may be used to inform all employees of an event using their corresponding telephone numbers).

Figure 2:
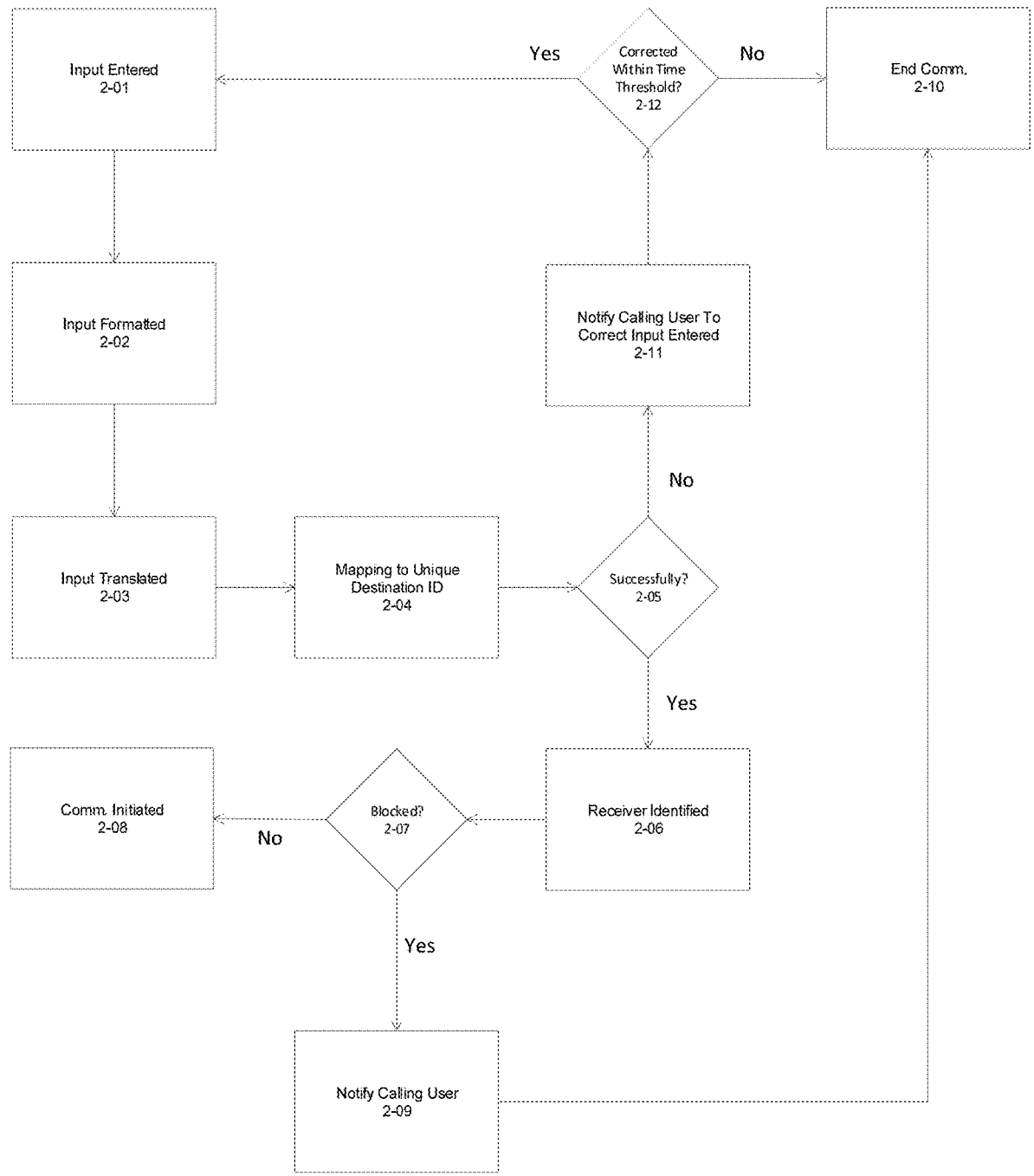
FIG. 2 is a flow chart for uniquely identifying the receiving party.
Figure 3:
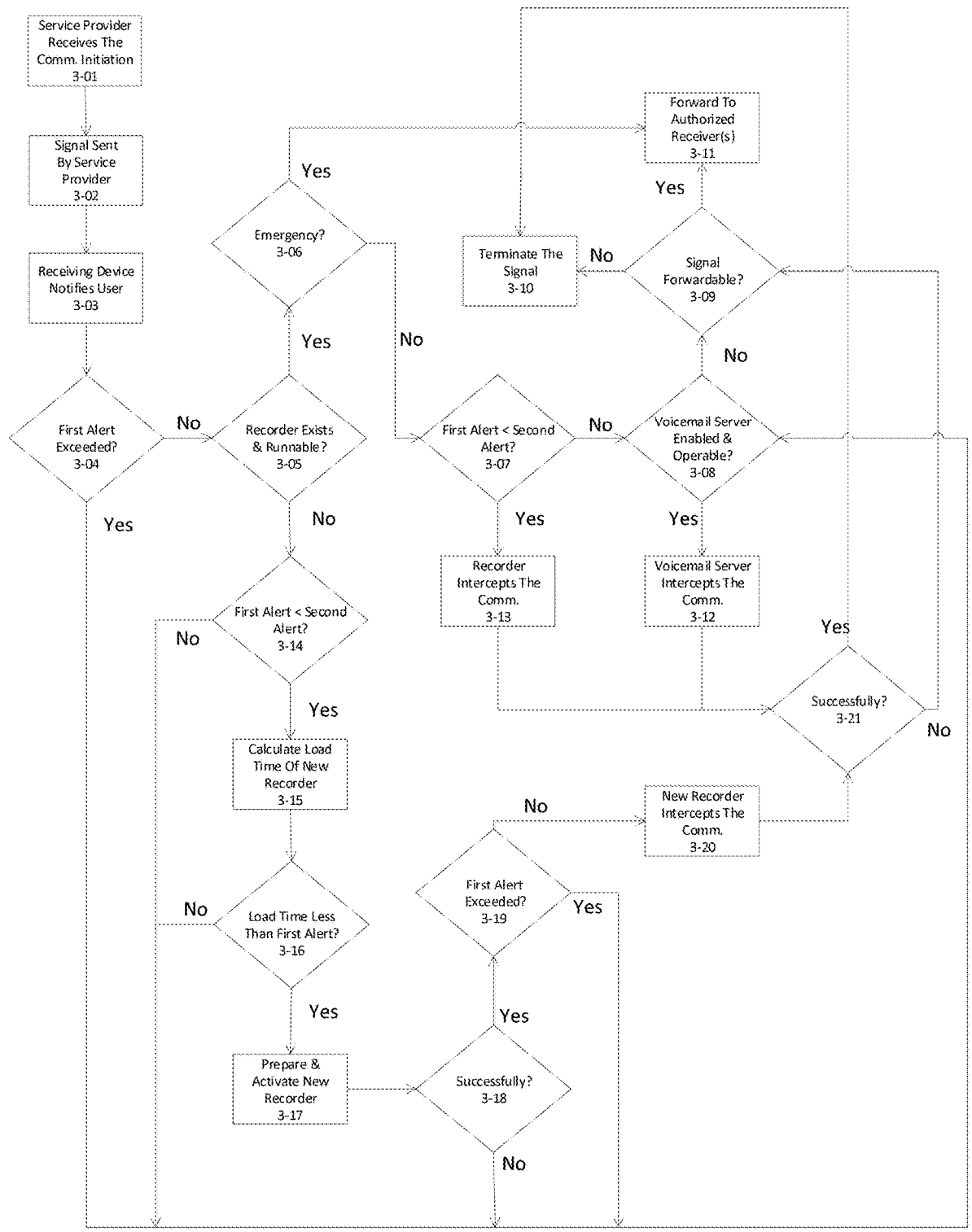
FIG. 3 is a flow chart of managing the incoming communication.

FIG. 2 is a flow chart of a process to uniquely identify a receiving party according to an embodiment of the present invention. Note that the chart in FIG. 2 and in any of the other figures described herein do not imply a fixed order to the steps, and embodiments of the present invention can be practiced in any order that is practicable. The method shown in FIG. 2 may be performed, for example, starting with step 2-01 where a user expresses an interest in communicating with another user, the user then inputs parameters comprising at least one identifier or a combination of identifiers into the user's device. At step 2-03, the input parameters are then formatted using any string format techniques such as concatenating, uppercase or lowercase conversion, whitespace or delimiter removal, template string conversion, binary or hexadecimal conversion, or any other technique or combination thereof. Such techniques are known in the art and will not be discussed further in this context. At step 2-03, the formatted input parameters, if not already in digits form, are then translated into their digits equivalent. At step 2-04, the translated digits equivalent is compared to a preregistered telephone number associated with the receiving user. If there is a match as determined in step 2-05, the receiving user is then uniquely identified at step 2-06, for example, by matching the translated digits to an address book stored on a service provider or a third-party service. At step 2-07, a determination whether or not the calling user is blocked by the receiving user is implemented, if so, the calling user is notified at step 2-09 and the communication is terminated at step 2-10. If the calling user is not blocked, the communication is initiated by the service provider as shown in FIG. 3. If there is no match as determined in step 2-05, the calling user is notified of such unmatched entry and advised to review the input to ensure that it has been entered correctly at step 2-11. If the calling user has made at least a change within a predefined threshold (e.g., 20 seconds) to the input as determined at step 2-12, steps 2-01 to 2-05 are implemented again. If the change is not detected at step 2-12, the communication is automatically terminated at step 2-10. Note that the termination of the communication may optionally be accompanied with a brief and automatic message describing at least a reason for the termination.

FIG. 3 is a flow chart of a process to handle the communication initiated by the calling user in FIG. 2. From steps 3-01 to 3-02, once the communication is initiated by the calling user, a signal is sent from a service provider (different or same for each calling and receiving party) to the receiving user. At step 3-03, the device associated with the receiving user then notifies its user of an incoming communication. The notification (alert or alarm) as used herein are user-perceivable notification that is perceived by the user through a human sense (e.g., sight, hearing, touch, smell, taste) of the user. Any a combination of such types of notifications can also be utilized in the spirit of the present principles. At step 3-04, the system will determine whether a number of notifications (e.g., number of rings, number of vibrations, number of light flashed, etc.) has reached a first threshold set by the receiving user. If the number of notifications has not reached its threshold, the system will determine whether a voicemail recorder is already installed and operable at step 3-05. If there is already an existing voicemail recorder, then the system will determine whether the incoming signal is a distress signal (e.g., emergency event that more is better informing someone directly than leaving a voice message, unless there is no other choice) at step 3-06, if so, the distress signal will be forwarded to at least one authorized user associated with the receiving user (e.g., relatives, emergency contact). If the signal is not a distress one, then the system will, at step 3-07, check for whether the first notification threshold is less than a second notification threshold set associated a voicemail server of the service provider of the receiving user, wherein the second threshold is set by either the receiving user or the service provider of the receiving user. If the first threshold is not less than the second threshold, the system will, at step 3-08, then determine if the voicemail server associated with the provider of the receiving user exists and enabled (e.g., through monthly subscription and storage space is not full). If so, the system will let the voicemail server to intercept the communication at step 3-12. Otherwise, the system will then determine whether the signal is forwardable at step 3-09 to the at least one authorized user and decide whether to terminate the signal at step 3-10 or implement the forwarding at step 3-11. If the first threshold of notifications is less than the second threshold of notifications as determined in step 3-07, the system will let the recorder to intercept the communication at step 3-13. If the recorder does not exist or cannot be activated as determined in step 3-05, the system will, at step 3-14, compare the first threshold with the second threshold to consider a replacement of the erroneous or non-existing recorder. If the first threshold is less than the second threshold, the system will, at step 3-15, calculate a complete load time of a new recorder wherein the complete load time is associated with one or more tasks (e.g., uninstalling, downloading, installing, verifying, activating, etc.) and/or device or network condition (e.g., latency, space reservation, available bandwidth, etc.). If the calculated complete load time is still less than the first threshold as determined at step 3-16, then the system, at step 3-17, will then proceed with the at least one tasks related to the new recorder. Once the new recorder is activated successfully at step 3-18 and the first threshold still has not been reached as determine at step 3-19, the system will, at step 3-20, allow the new recorder to handle the communication on behalf of the receiving user. It is noted that once any recorder or the voicemail server is assigned to record the communication at steps 3-19, 3-12, and 3-13 respectively, if the communication is recorded successfully without any error as determined at step 3-21, the communication is then terminated at step 3-10. Otherwise, steps 3-09 to 3-11 are implemented as described above. It is to be appreciated that after the voicemail server successfully recorded the voice message, the recorded voice message can be downloaded automatically by either the voicemail recorder or the new voicemail recorder once any associated error has been fixed. A notification can also be set to alert the receiving user of such newly available voice messages.

Figure 4:
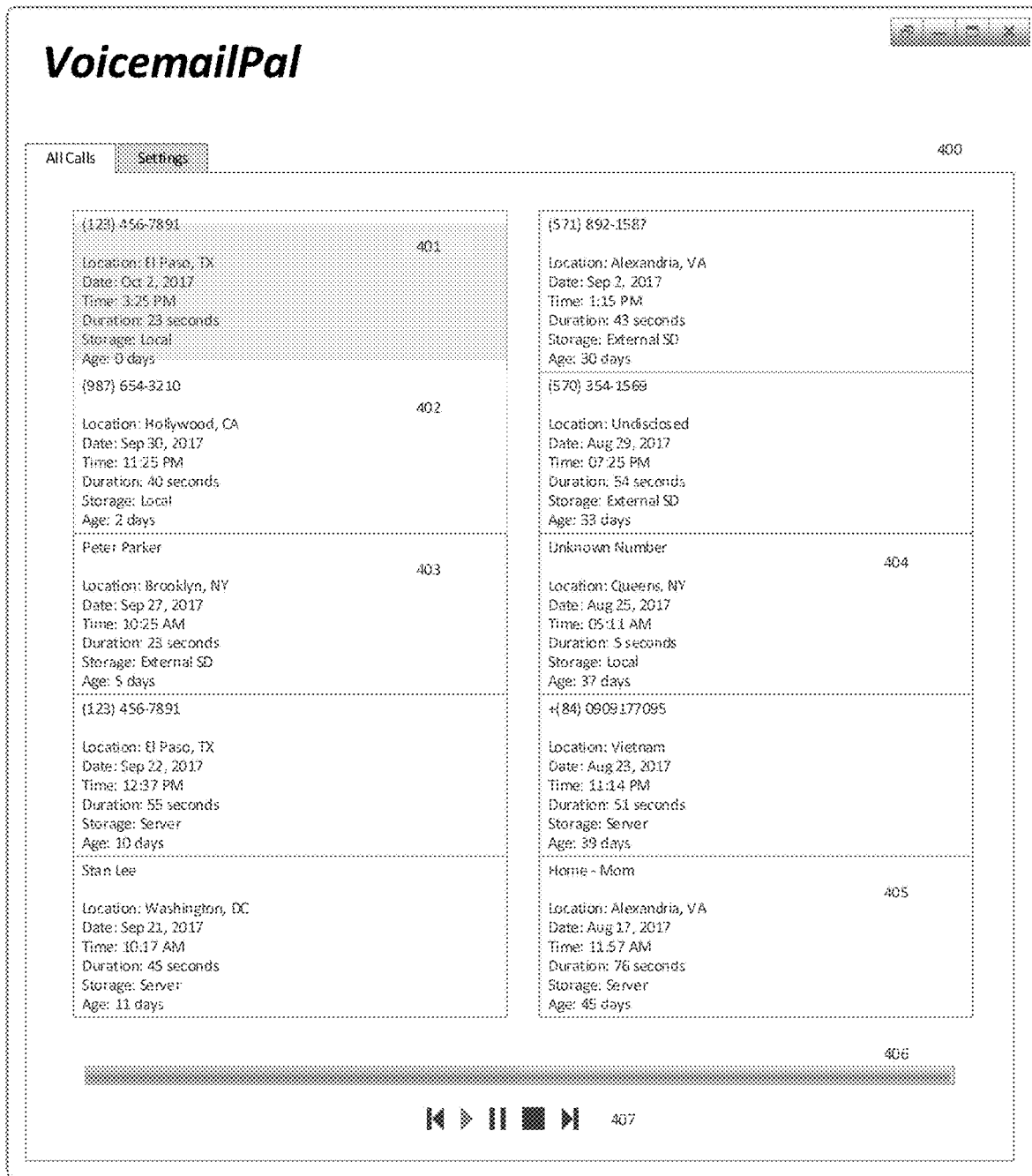
FIG. 4 is an exemplary illustration of how a recorded voice message and its attributes are displayed that conveys the most information of a missed call to a recipient user

FIG. 4 is an exemplary illustration of how a recorded voice message and its attributes are displayed that conveys the most information of the corresponding missed call to a recipient user. The interface 400 represents a tab layout but could be any other layouts (e.g., linear, grid). Whenever a tab is selected (i.e., tab "All Calls"), the selected and non-selected tabs will be visually distinguished (e.g., greyed out for non-selected tabs) per characteristic of the tab layout. Same goes for a selected element 401 of the interface 400. Noted that a list of recorded voice messages is displayed and each is associated with a number of pre-determined attributes such as raw phone number if the originator user of the voice message is not in the contact list of the recipient user as shown in items 402. If caller ID feature is available and the originator user is not in the contact list, the registered name of the originator with his/her service provider could be displayed as shown in item 403. If the originator user wishes to not disclose his identify, the corresponding recorded message be associated with "Unknown Number" as shown in item 404. Otherwise, identifier of the originator user could be displayed as set in the contact list of the recipient user as shown in 405. Each recorded message is also associated with a date/time, a duration, and a storage location as shown in items 401-405. Further, each recorded message may be associated with a real-time location of the originator user when the message was being recorded. This can be achieved by the installed recorder or voicemail server polling for geographic location associated with the originator user's physical location (e.g., GPS coordinator, closest landmark, highway exit number, etc.) or the device associated with the originator pushing his or her determined physical location to the instant system when the message is being recorded. When the message is selected for playback, the built-in media player 407 and media bar 406 are utilized to manage the playback as is known in the art.

Figure 5:
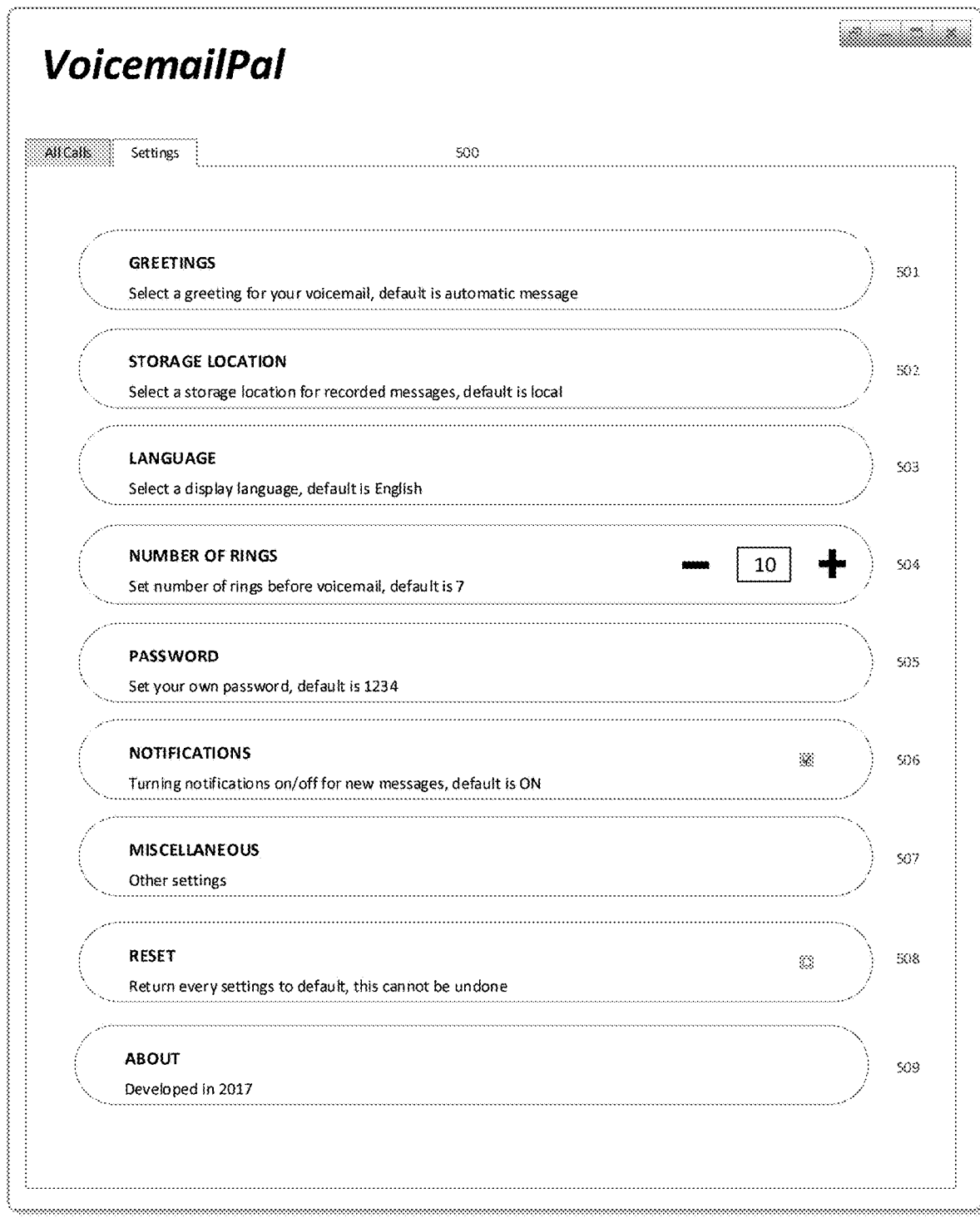
FIG. 5 is an exemplary illustration of account management used by a registered user of the instant system.

FIG. 5 is an exemplary illustration of account management of a registered user of the instant system. As the registration and log-in processes are known in the art, such processes are not described hereon. Assuming that a registered user has successfully logged in a management application, internal or external to the registered user's device, the user is presented with a plurality of options to manage his or her account wherein the options, once set, will be effective immediately without restarting the device and/or connection to the management server. As shown in this figure, option 501 allows the registered user to select a type of a greeting message including at least a default audio message with or without the registered user's identity announced (e.g., "Welcome to Peter Parker's voicemail" or "Welcome to my voicemail"), a text-to-speech message that converts the registered user's typed message into audio, and a custom or personal audio message associated with the registered user (e.g., by actuating a voice recorder or selecting a pre-recorded audio message preferred by the registered user). Option 502 allows the registered user to specify a storage location for recorded messages (e.g., local device, external memory, or personal server). Further, option 502 may specify a schedule and direction to archive or migrate between locally stored messages (e.g., local device including internal or external memory) and remotely stored messages (e.g., voicemail server of the service provider or any personal server associated with the registered user). Option 503 allows the registered user to specify a language to be used within the management application. Note that the language settings may be effective within the management application only regardless the global language settings of the device running the management application (e.g., an Android device with global language settings as "English" may not affect the local language settings when the registered user sets the language settings of the management application to "Vietnamese." Option 504 allows the registered user to set a number of notifications such that the local recorder would always have higher priority to manage the incoming communication than the voicemail server. For example, by default, the voicemail server sets a number of notifications (i.e., second threshold in FIG. 3) as 11 rings. If the registered user wants the local recorder to handle any incoming call, the registered user should set a separate number of notifications (i.e., first threshold in FIG. 3) as 7 rings. That way, the local recorder is assigned to intercept the incoming communication immediately after the $7^{th}$ ring. If an issue occurs as described above, the voicemail server is assigned to intercept the incoming communication immediately after the $11^{th}$ ring. Option 505 allows the registered user to change the personal password used to access stored voicemails regardless of storage location(s). Option 506 allows the registered user to change notification settings based on personal preferences (e.g., when a new voicemail arrives, when an old voicemail expires and to be archived to the personal server, or when messages stored on the voicemail server are migrated to the local device corresponding to space requirement of the voicemail server). Option 507 allows the registered user to access a plurality of other settings (e.g., migration and/or archival condition, whether an access password is always required). Option 508 allows the registered user to reset all settings to their default values. Option 509 allows the registered user to contact access contact information of the app developer and providing feedback or bug report. It should be noted that the settings options are not limited to those as described above and any other options can be edited, added, removed, repositioned within the spirit of the invention.

Figure 6:
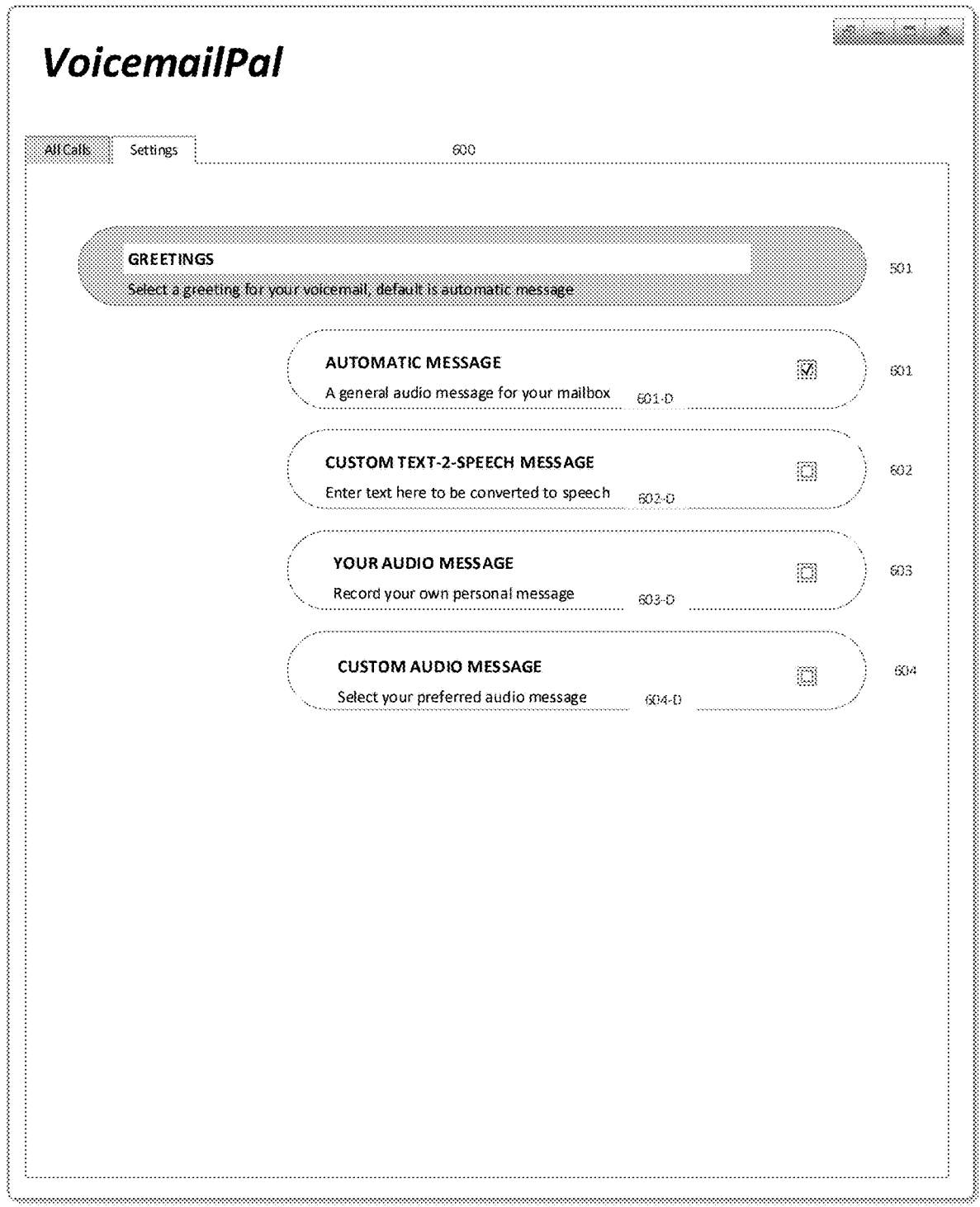
FIGS. 6-7 show each an exemplary illustration of managing greetings of voicemail-box.
Figure 7:
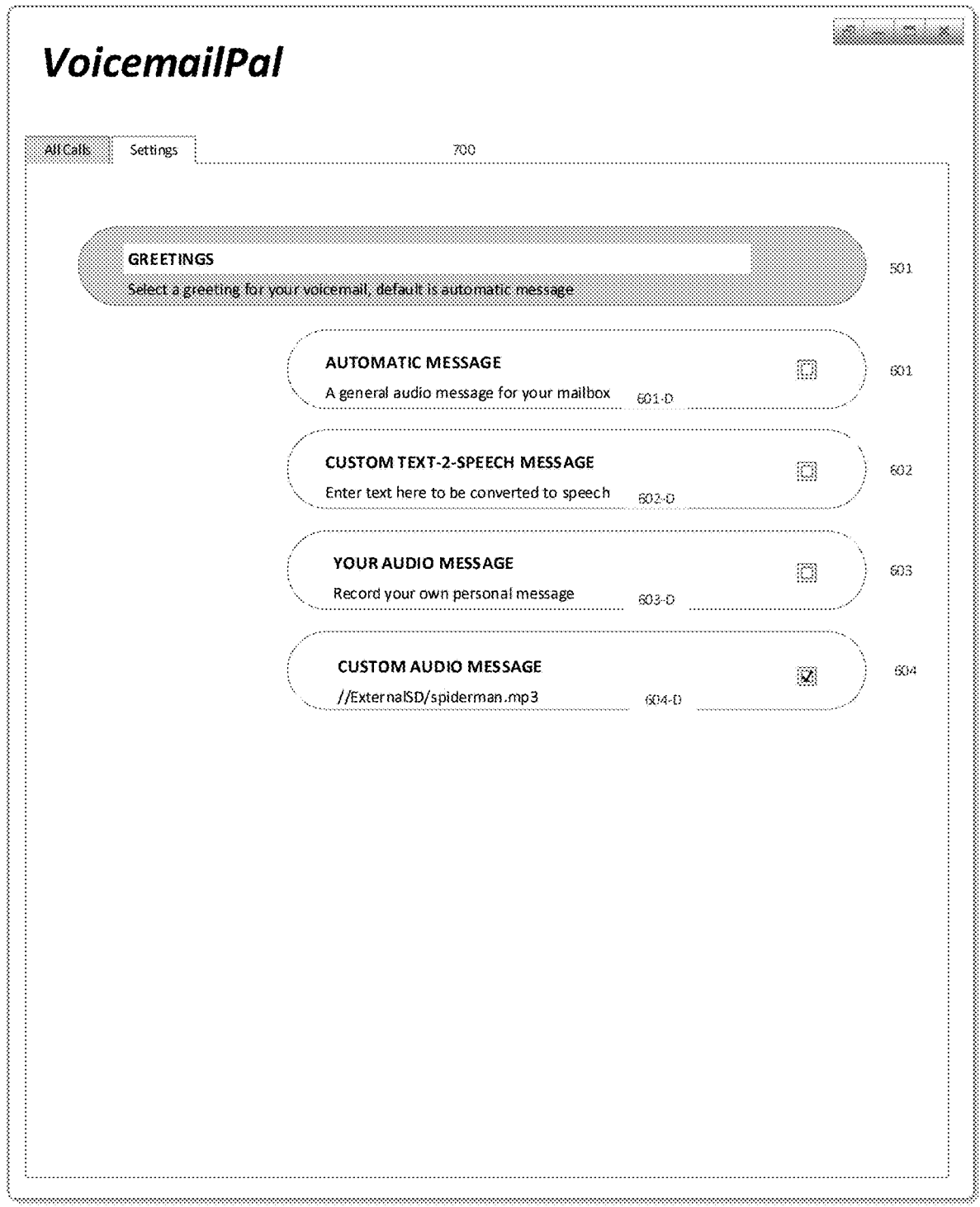

FIG. 6 shows an exemplary illustration of when the setting 501 is selected, a plurality of sub-options is displayed with appropriate GUI elements to activate a selected sub-option. By selecting option 603, a voice recorder will be displayed and the recorded message is instantly effective as the greeting message. By selecting option 604, a file selector (e.g., file explorer, file manager) (not shown) will be displayed to allow the registered user to navigate and select the preferred audio file. It is noted that the text description 601-D to 604-D of the sub-options 601-604 can be replaced by any predefined text upon the sub-option is selected. FIG. 7 shows that when a custom audio message, e.g., spiderman.mp3, is selected to be used as the custom audio message, the text description 604-D in FIG. 6 is replaced by the text description 604-D in FIG. 7.

Figure 8:
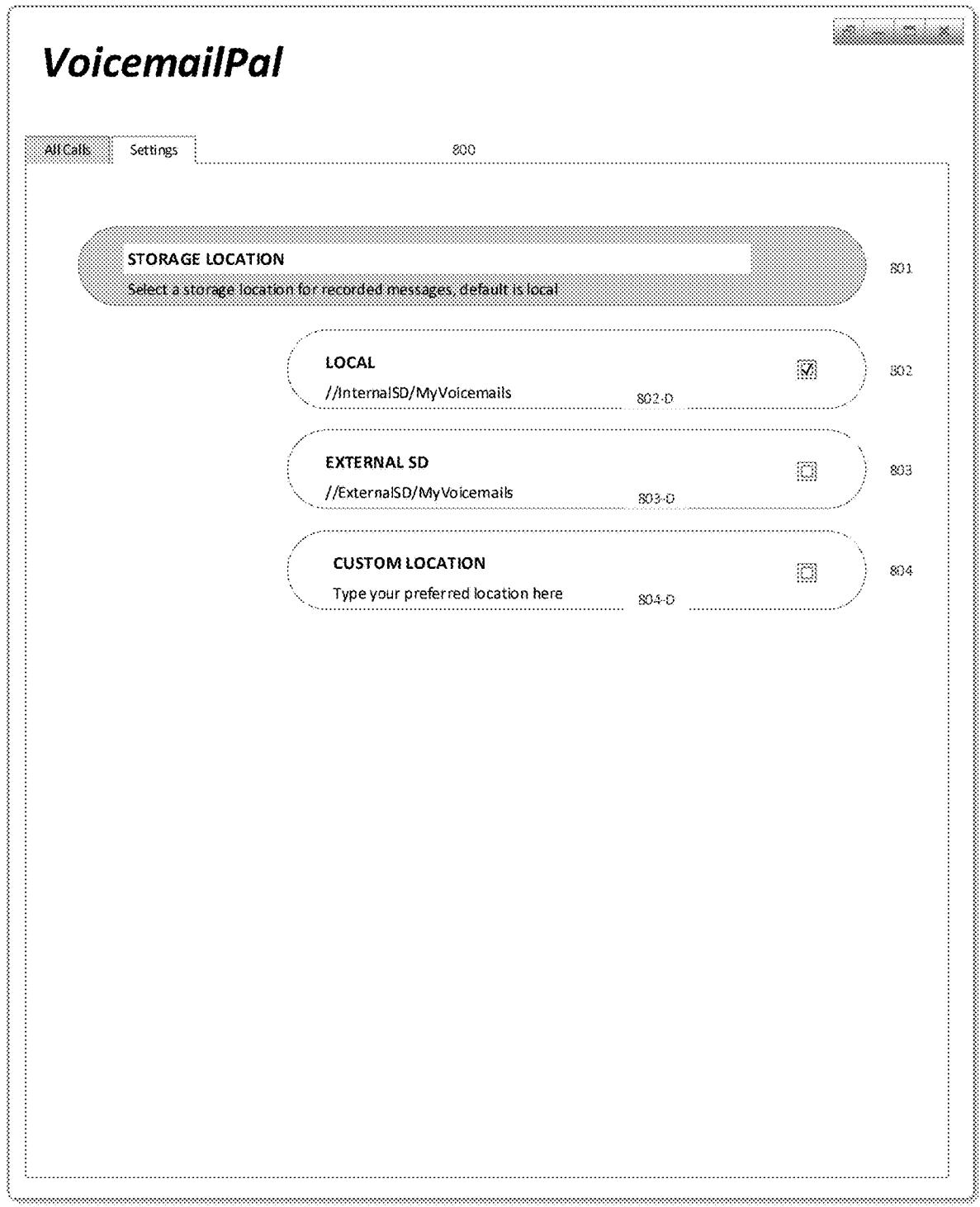
FIGS. 8-10 show each an exemplary illustration of managing storage locations for the voicemails.
Figure 9:
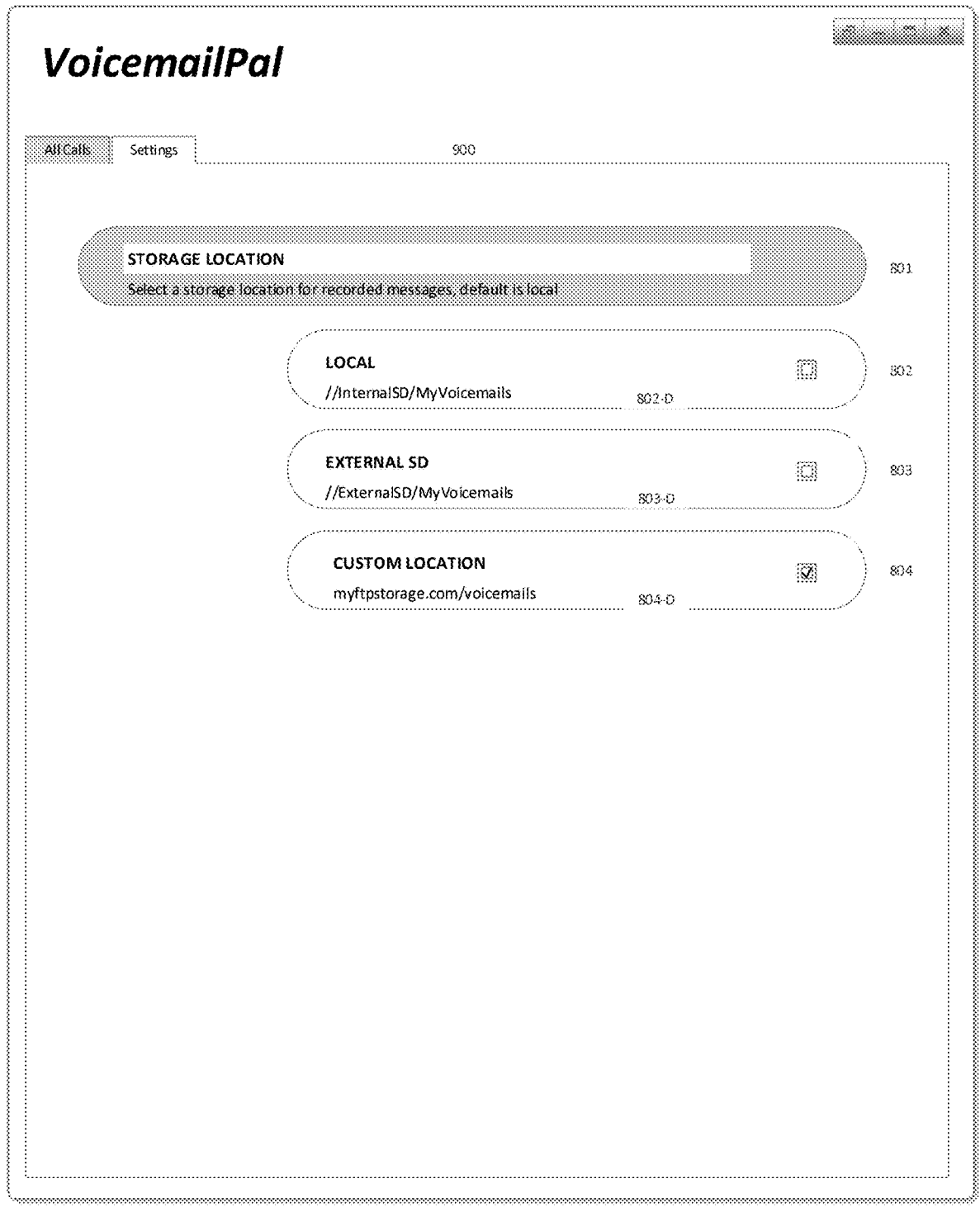
Figure 10:
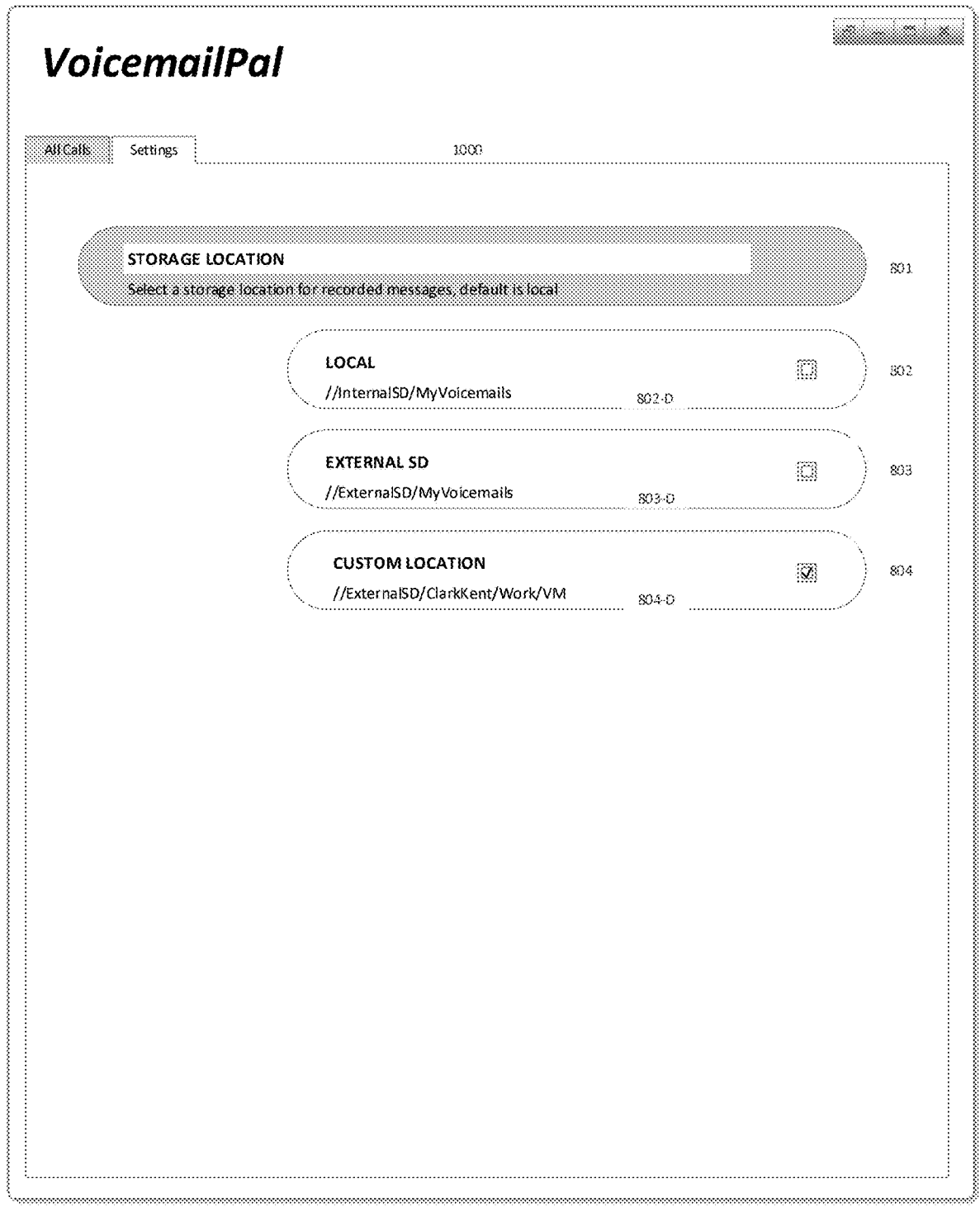

FIG. 8 shows an exemplary illustration of when the setting 801 is selected, a plurality of sub-options is displayed with appropriate GUI elements to activate a selected sub-option. By selecting options 802-803, the registered user can quickly select a default and pre-created directory on the internal or external memory. If the registered user wants to store voicemails in another location (remotely as shown in 804-D in FIG. 9 or locally as shown in 804-D in FIG. 10), the management application will place any new incoming voicemail into the custom location and its directory assuming that registered user is authenticable to the custom location (e.g., user logs in the remote server "myftpstorage.com" successfully) and the registered user has permission to create a folder at the custom location. If the incoming voice message is unable to be saved at the specified custom location and/or its directory, the incoming voice message is automatically saved in the default local storage and the user is notified appropriately of such operation(s).

Figure 11:
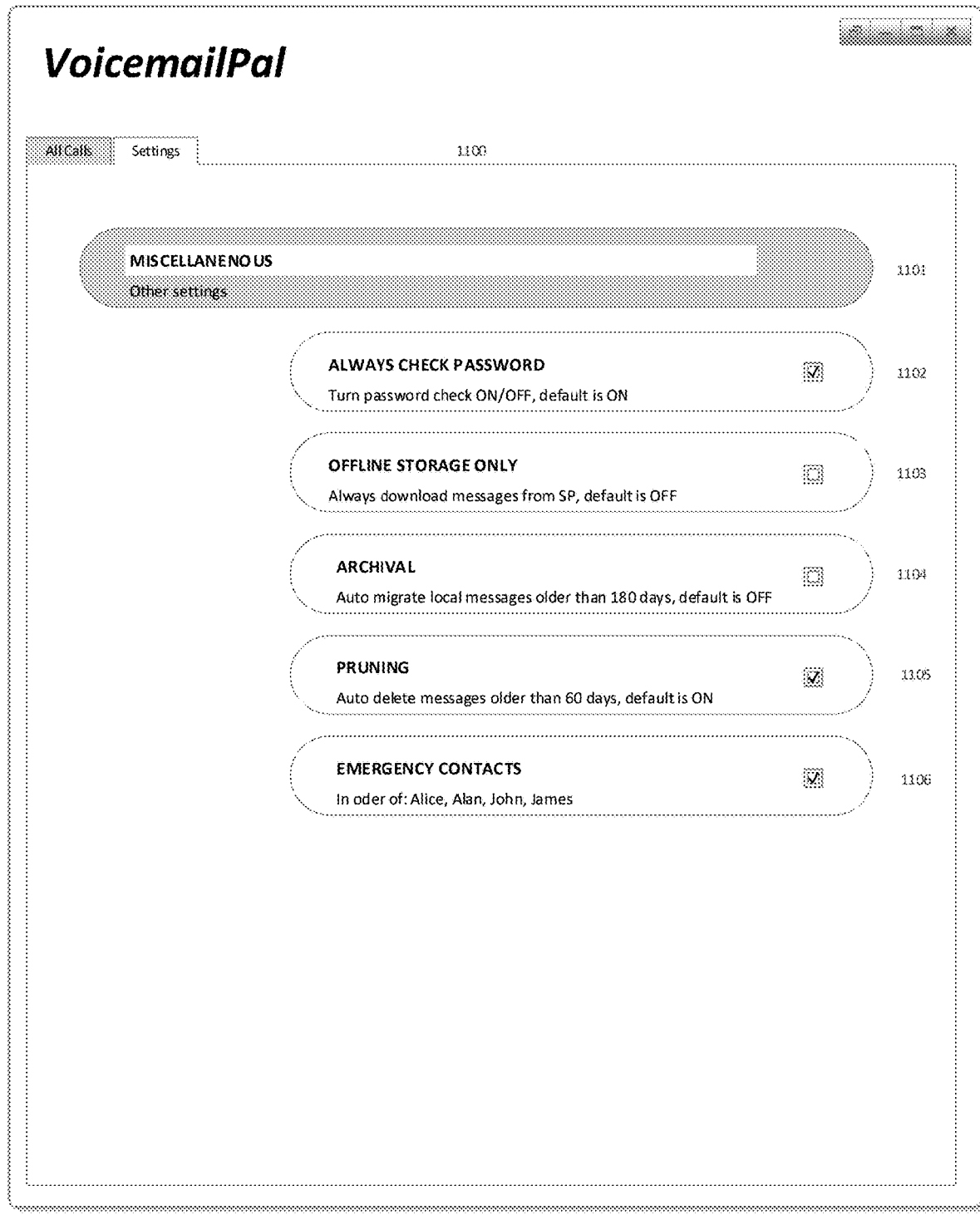
FIG. 11 shows is an exemplary illustration of the miscellaneous settings.

FIG. 11 shows an exemplary illustration of when the setting 1101 is selected, a plurality of sub-options is displayed with appropriate GUI elements to activate a selected sub-option. Option 1102 allows the registered user to turn on/off password requirement to access voicemails regardless of their storage locations. Option 1103 allows the registered user to specify that any voice messages stored remotely either on the voicemail server of the service provider or the personal server are moved to the local device either in the internal or external memory. Option 1104 allows the registered user to specify whether or not to migrate locally stored messages to the personal storage server (e.g. myftpstorage.com). Option 1105 allows the registered user to specify whether or not locally stored messages are deleted after a predefined time period (e.g., after 60 days). It should be noted that any other options not described above to manage stored voice messages are also made available and not outside the scope of the instant embodiments. Option 1106 allows the registered user to specify a routing of emergency calls according to FIG. 3.

Figure 12:
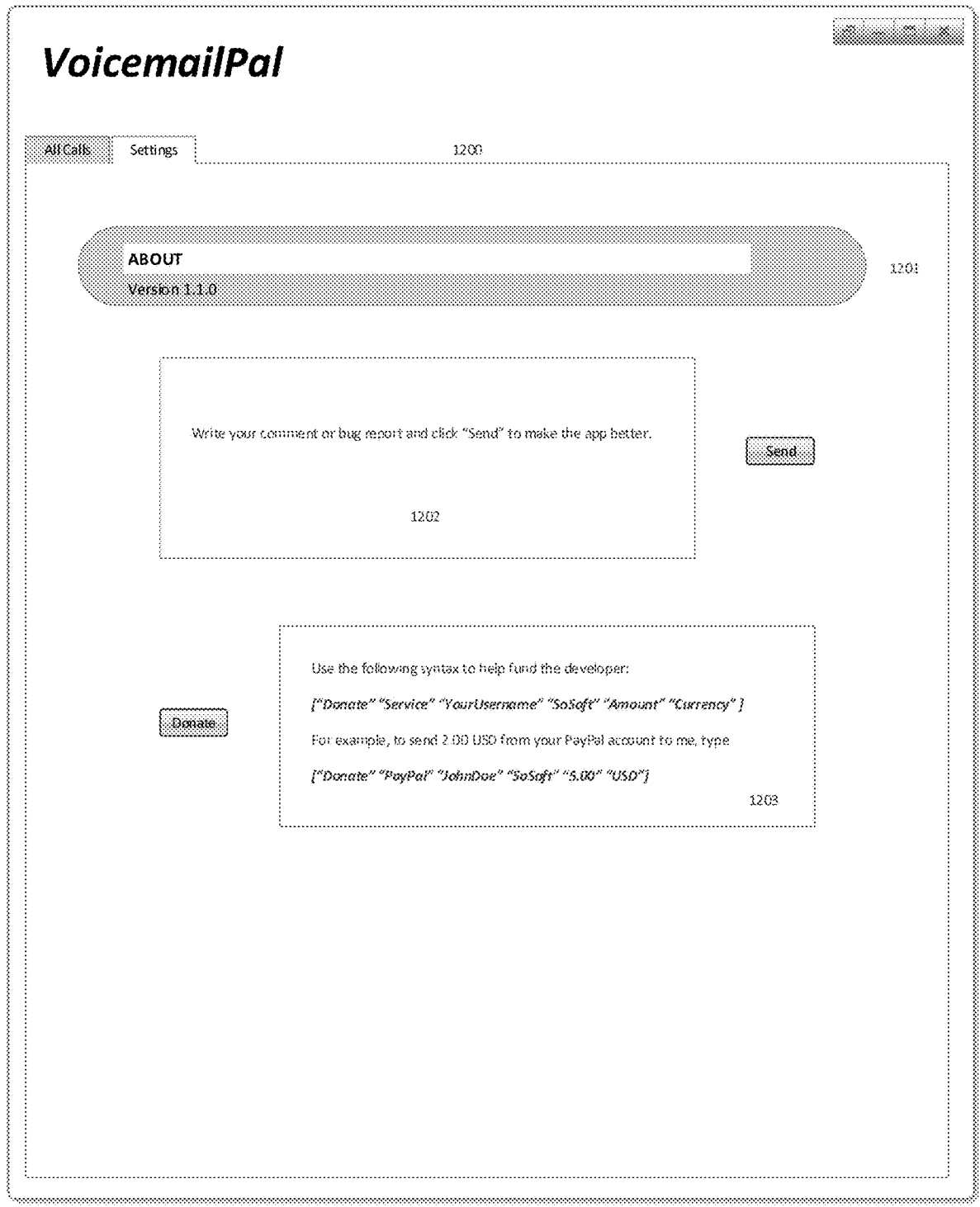
FIG. 12 shows each an exemplary illustration of sending comments and bug report of the management application.

FIG. 12 shows an exemplary illustration of when the setting 1201 is selected, a plurality of sub-options is displayed with appropriate GUI elements to activate a selected sub-option. Option 1202 allows the registered user submit a comment or a bug report to the developer. Option 1203 allows the registered user to quickly donate a monetary amount in any currency to the developer using a short and concise syntax. It is noted that the invention is not only limited to the syntax displayed in 1203 but any other syntax that is within the scope of the instant embodiments.

FIGS. 13(a)-(b) show each an exemplary illustration when an input format is entered, formatted, translated and correctly mapped to at least a unique phone number of at least one receiving user.

FIG. 14 shows a translated input may map to a receiving party which comprises multiple users such as matched entries 1403-1404. If multiple entries are matched, the communication may be initiated to each user in the receiving party in a sequential manner (e.g., similar to 3-way calling) in a specified order taking into account the emergency procedure as shown in FIG. 3. For example, if Alice (order 1) and John (order 2) are registered with different phone number to a unique translated input, wherein Alice lists Alan as her emergency contact and John lists James as his emergency contact. A non-emergency call from Peter will be routed as: Alice→Alice's voicemail-box→John→John's voicemail-box. An emergency call from Peter will be routed as: Alice→Alan→Alan's voicemail-box→John→James-→James' voicemail-box. It is noted that the routes and the order of contacts can be adjusted by the registered user using the management application further to the descriptions of FIGS. 3, and 11.

Figure 15:
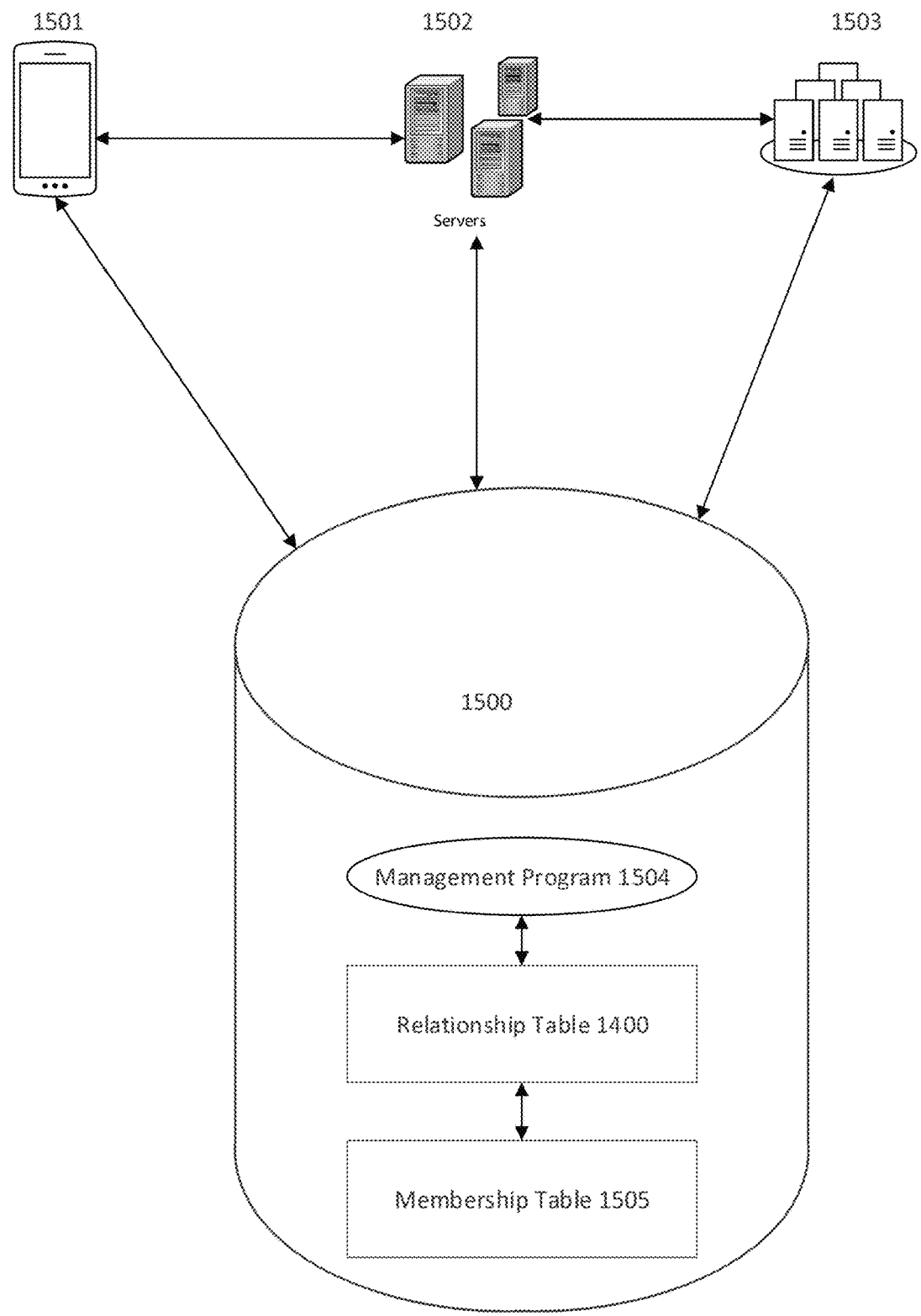
FIG. 15 shows an exemplary architecture of connections between relationship database among different entities.

FIG. 15 shows an exemplary architecture of the current invention with clients of the system communicate with one another with information stored in database 1500, wherein the database contains at least relationship table 1400 as shown in FIG. 4 and at least a conventional membership table containing usernames and/or passwords of the registered members. Program 1504 interfaces with entities 1501-1503 to manage interactions such as those disclosed above including membership management, facilitating communication between registered users as described above. Further, it should be appreciated that the management program 1504 and the database 1500 could be stored together or separately (e.g., either program and/or database is stored within any of the entities 1501-1503) and information stored in the database could be obtained in various ways. For example, members 1501 of the current system could communicate with one another using the database 1500 stored within a third-party database 1503. Information within the database 1500 could be retrieved by the management program 1504 stored in at least one of the members 1501 or in at least one of the service providers 1502. Any known methods of client-server communication could be applied and is not outside the scope of the described embodiments. In one embodiment, all registered users of the system are polled at least once per a predetermined period of time to assure their contacts numbers are maintained correctly and up-to-date. If no response received within a second predetermined period of time for a specific member (e.g., 1 week for premium/paid users, and/or 24 hours for trial/free users), the specific member is marked as inactive and corresponding actions are implemented (e.g., removal of membership, charge an inactive fee, etc.).

Figure 16:
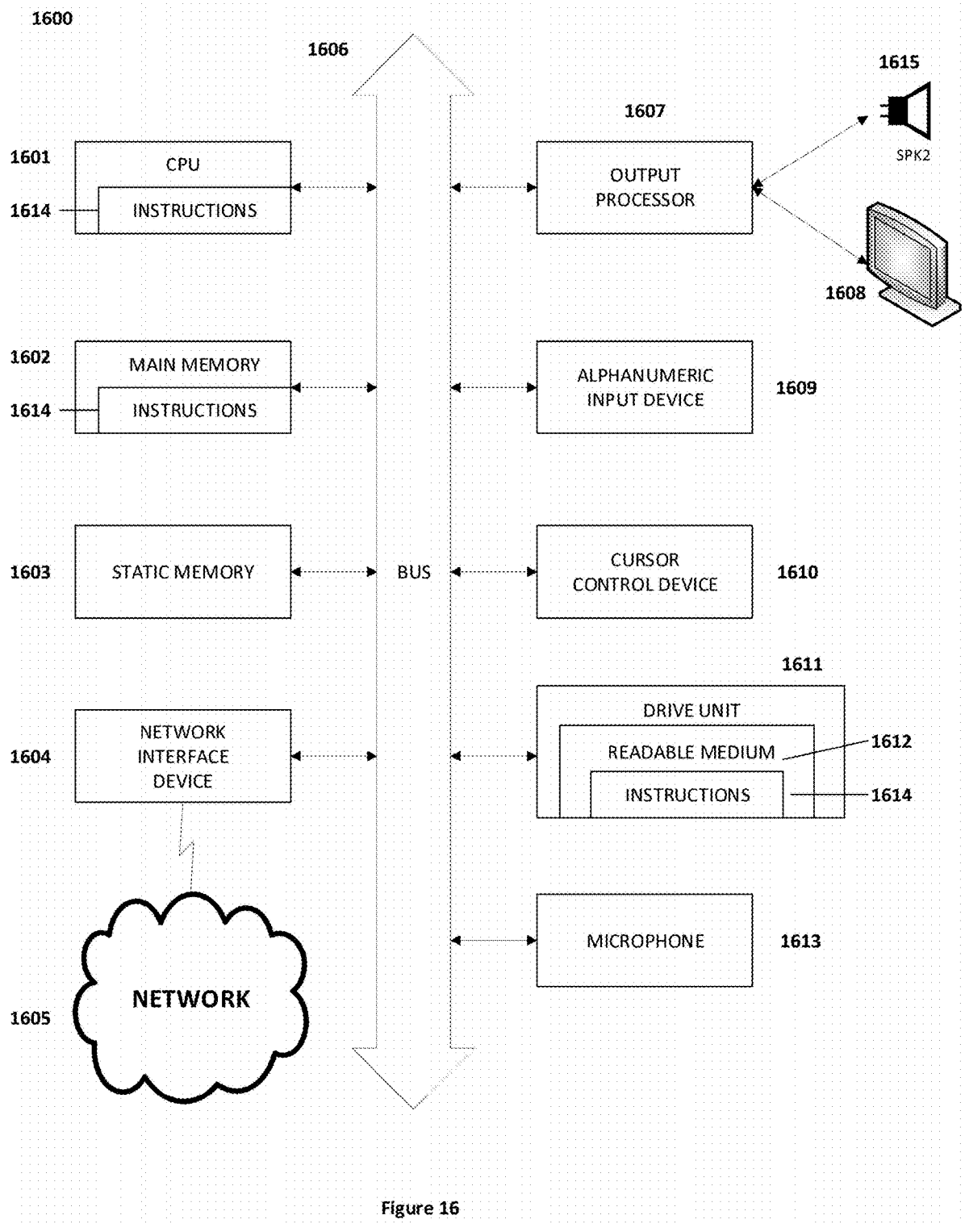
FIG. 16 is a block schematic diagram of a machine in the exemplary form of a computer system within which a set of instructions for causing the machine to perform any one of the herein disclosed methodologies may be executed.

FIG. 16 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a central processing unit (CPU) 1601, a main memory 1602 and a static memory 1603, which communicate with each other via a bus 1604. The computer system 1600 may further include one or more audio/visual processors 1607 to output audio/visual signals to a display 1608 and speaker 1615, for example, a liquid crystal display (LCD) or a cathode ray tube (CRT). The computer system may 1600 also include an input device 1609, for example, a keyboard or keypad; a cursor control device 1610, for example, a mouse; a disk drive unit 1611, a microphone 1613 for sound recording and/or vocal commands, and a network interface device 1604.

The disk drive unit 1611 includes a machine-readable medium 1612 on which is stored a set of executable instructions, i.e. software, 1614 embodying any one, or all, of the methodologies described herein. The software 1614 is also shown to reside, completely or at least partially, within the main memory 1602 and/or within the CPU 1601. The software 1614 may further be transmitted or received over a network 1605 by means of a network interface device 1604.

In contrast to the system 1600 discussed above, a different embodiment uses logic circuitry instead of computer-executed instructions to implement processing entities.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction.

Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A computer-readable storage medium includes any mechanism for storing or transmitting information in a form readable by a machine, e.g. a computer. For example, a computer-readable storage medium may include read-only memory (ROM), random access memory (RAM), magnetic disk storage media, optical storage media, flash memory devices; electrical, optical, acoustical or other form of propagated signals, for example, carrier waves, infrared signals, digital signals, or any other type of media suitable for storing and/or transmitting information.

Generally, a computer, computer system, subsystem, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to be used to specify the presence of stated features, elements, integers, steps or components, and do not preclude, nor imply the necessity for, the presence or addition of one or more other features, elements, integers, steps, components or groups thereof.

The described embodiments above of the present invention do not constitute a definition of all possible embodiments, and those skilled in the art will understand that the present invention is applicable to many other embodiments. Further, those skilled in the art will understand how to make any changes, if necessary, to the above-described systems and methods to accommodate these and other embodiments and applications.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method, utilizing at least one hardware computing device, for managing multimedia messages including voicemails, the method comprising:
    (A) receiving, by a first device associated with a first party, an input entered by the first party to initiate a communication to second device associated with a second party, wherein a party comprises one or more users;
    (B) formatting, by the first device, the received input into a standardized format;
    (C) translating, by the first device, the formatted input in the standardized format into a predetermined communication format, wherein the standardized format is distinct and different from the predetermined communication format;
    (D) mapping, at least by the first device, the translated input in the predetermined communication format to a unique destination identifier associated with the second party;
    (E) determining, at least by the first device:
        whether the mapping is successful;
        in response to a successful mapping, determining whether the first party is in a block list associated with the second party, if so, notifying the first party and terminating the communication;
        in response to an unsuccessful mapping, notifying the first party to review and correct the input entered;
        in response to determining that the first party has made at least one change to the input entered within a predetermined input time threshold, repeat steps (A) to (E);
        in response to determining that the first party has not made the at least one change to the input entered within the predetermined input time threshold, notifying the first party and terminating the communication;
    (F) in response to the successful mapping and determining that the first party is not in the block list associated with the second party, allowing, by the first device, the communication to the second device based at least on the unique destination identifier associated with the second party;
    (G) transmitting, by a communication server located remotely from the first party associated with the first device and the second party associated with the second device, a signal associated with the communication through at least one communication network associated with at least one service provider;
    (H) receiving, by the second device, the signal through the at least one communication network;
    (I) notifying, by the second device, the second party of the received signal with a predetermined number of notifications.

2. The method of claim 1, further comprising:
    receiving the communication by the second device; and
    recording and storing the received communication by an existing audio recorder installed on the second device, a new audio recorder in place of the existing audio recorder, or an audio server associated with the at least one service provider.

3. The method of claim 2, further comprising:
    in response to determining that the received communication is recorded or stored successfully, terminating the connection to the communication server.

4. The method of claim 1, wherein the input entered specifying an identifier associated with the second party in at least one of: text, image, audio, video, or any combination thereof.

5. The method of claim 2, further comprising obtaining the stored communication, wherein at least one of the storing and the obtaining is based on a unique first identifier associated with the communication.

6. The method of claim 5, wherein the unique first identifier comprises at least one of:
    an identifier associated with the first party;
    a date associated with the recorded communication;
    a duration associated with the recorded communication; or a storage path associated with the recorded communication.

7. The method of claim 2, wherein the second party is provided with at least one option to manage the stored communication.

8. The method of claim 7, wherein the at least one option comprises at least one of downloading the stored communication from a server storage to a local storage, or uploading the stored communication from the local storage to a storage server associated with the second party the at least one option being associated with at least one criterion.

9. The method of claim 8, wherein the at least one criterion comprising a time parameter, a size parameter, a priority parameter, or any combination thereof.

* * * * *